United States Patent [19]

Verhoeven et al.

[11] 4,055,350
[45] Oct. 25, 1977

[54] CHANGER PIN FOR A RECORD CHANGER

[75] Inventors: Robertus Jozefus Maria Verhoeven; Daniel Ong, both of Eindhoven, Netherlands

[73] Assignee: U.S. Philips Corporation, New York, N.Y.

[21] Appl. No.: 677,211

[22] Filed: Apr. 15, 1976

[30] Foreign Application Priority Data

May 7, 1975 Netherlands ............ 7505356

[51] Int. Cl.² .......................... G11B 17/04
[52] U.S. Cl. .................................. 274/10 S
[58] Field of Search ....................... 274/10 S

[56] References Cited

U.S. PATENT DOCUMENTS

| 2,615,720 | 10/1952 | Miller et al. | 274/10 S |
| 3,021,144 | 2/1962 | Harnisch et al. | 274/10 S |
| 3,257,114 | 6/1966 | Hansen | 274/10 S |
| 3,265,393 | 8/1966 | Freier | 274/10 S |
| 3,380,741 | 4/1968 | Babler et al. | 274/10 S |
| 3,632,116 | 1/1972 | Perge | 274/10 S |

Primary Examiner—Richard E. Aegerter
Attorney, Agent, or Firm—Frank R. Trifari; David R. Treacy

[57] ABSTRACT

A changer pin for a record changer suitable for completely independently supporting a number of gramophone records with a small central opening, which are stacked on the changer pin, above the turntable, and for changing said records. The pin comprises a control slide which controls the coordinated movements of an integral unit forming three record supports, another integral unit forming three record lifters and a third unit forming three record hold-down devices for holding down the lowermost record while the remainder of the stack of records is lifted.

4 Claims, 9 Drawing Figures

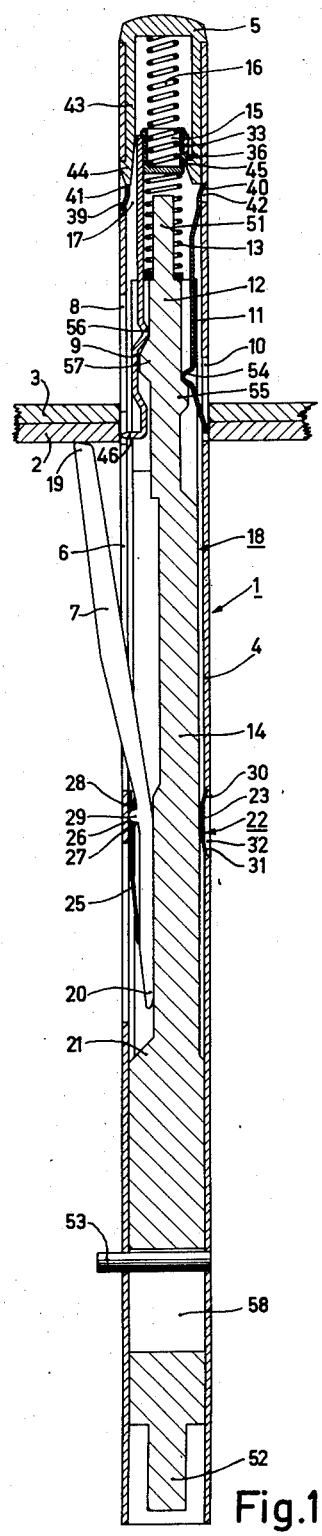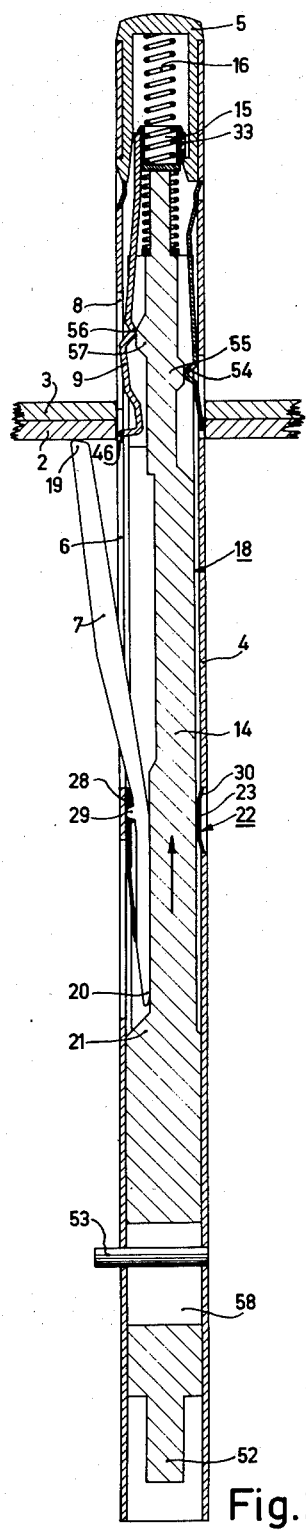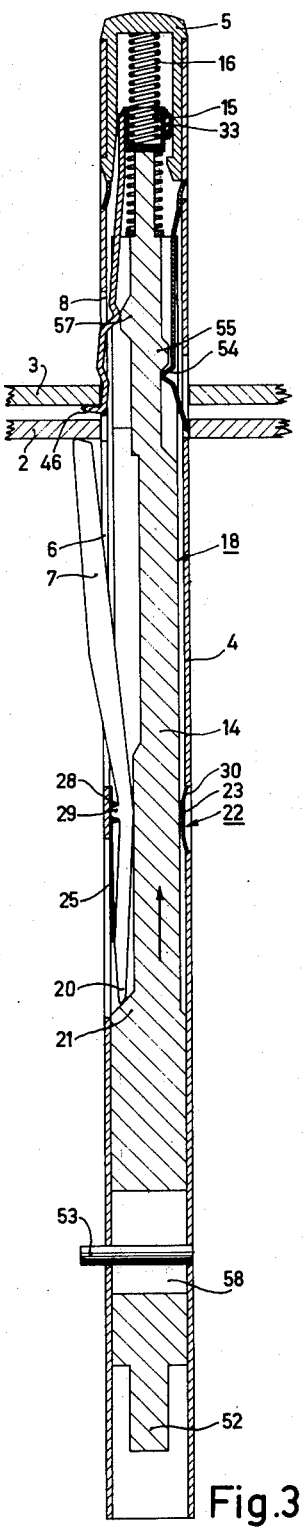

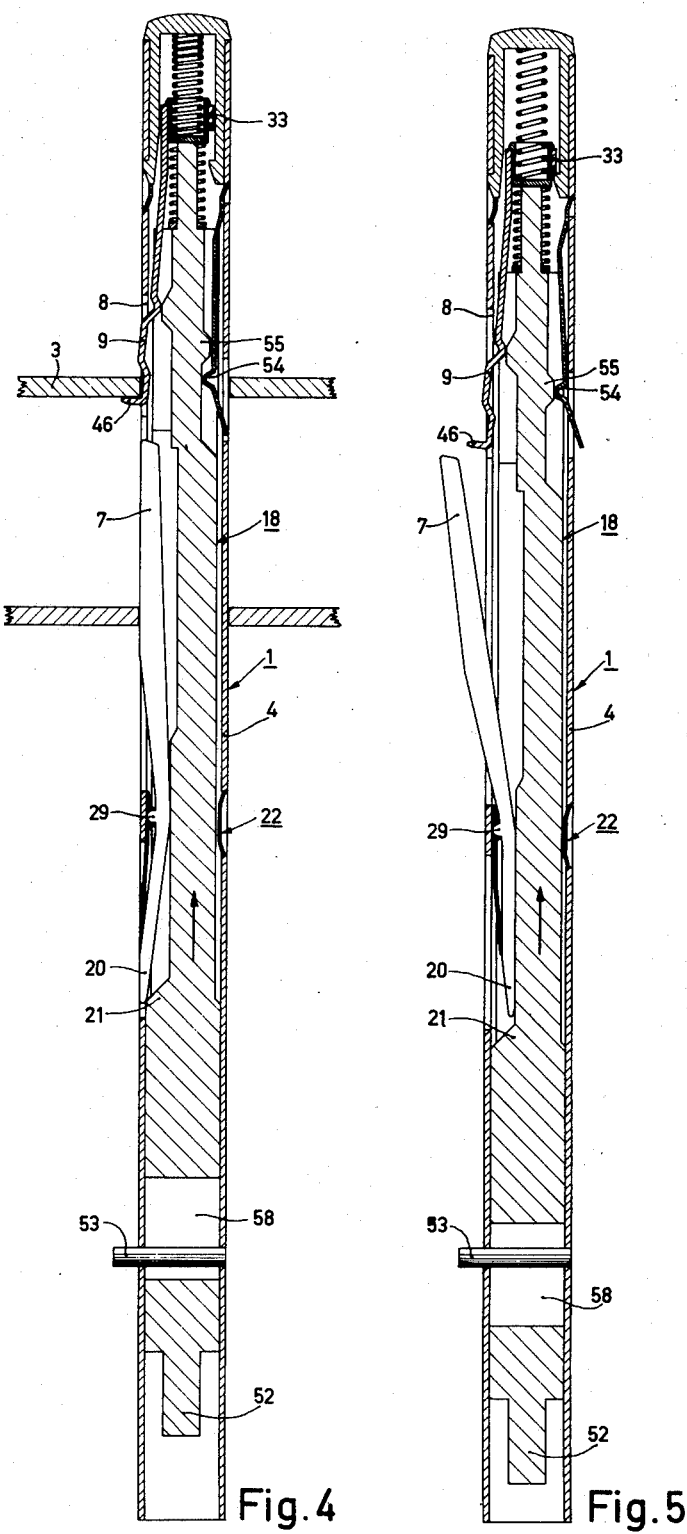

CHANGER PIN FOR A RECORD CHANGER

BACKGROUND OF THE INVENTION

The invention relates to a changer spindle for a record changer which is provided with a changing mechanism and which is suitable for changing and completely independently supporting a number of phonograph records with a central opening of substantially 7 mm, which are stacked on the changer pin, above the turntable of the record changer, such a changer spindle or pin typically comprises a cylindrical sleeve for accommodating the mechanism of the changer pin; an endcap at one end of the sleeve; at least three spring-loaded record supports which can be pivoted out of the sleeve through slots in the sleeve; at least three record lifters which can be pivoted out of the sleeve through slots in the sleeve and which are axially movable to a limited extent; a number of record hold-down devices which are movable out of the sleeve through slots in the sleeve, for holding down the lowermost record of the stack of records on the changer pin during a phase in the changing cycle in which the upper records are lifted off the lowermost record; a first control slide for the actuation of the record lifters and the record hold-down devices, which slide is axially movable in the sleeve by the changing mechanism of the record changer and which is provided with cam profiles; a pressure spring for axially loading the first control slide in a direction away from the end cap; a second control slide which is axially movable in the sleeve by the changing mechanism of the record changer and which cooperates with the record supports; an axially movable connecting member to which the record lifters are connected with one end; a pressure spring for axially loading the sleeve in a direction away from the end cap; and a connecting member for rigidly connecting the record hold-down devices to the sleeve at one of their ends.

For the correct operation of a known changer pin of the type described above a comparatively large number of components are required. Moreover, the changing mechanism of the record changer should provide two types of movement, one movement serving for driving the record supports and the other movement for driving the record lifters and the record hold-down devices. The record lifters as well as the record hold-down devices consists of resilient metal strips the strips are secured by one of their ends in a movable fixing member which is movable inside the sleeve and in recesses in the end cap respectively. To actuate the mechanism of the changer pin the changing mechanism of the record changer must produce a comparatively great force (German Patent Specification No. 1,930,893).

SUMMARY OF THE INVENTION

It is an object of the invention to provide a changer pin of the type described above which comprises a smaller number of components and which can be driven by a single movement of the changing mechanism. A further object of the invention is to reduce the driving force to be produced by the changing mechanism of the changer. According to the invention the first and the second control slide are combined with each other into a single combined control slide, and the record supports consist of two-armed levers, which between their ends are hingeably connected to the sleeve, the ends of the supports which are disposed in the sleeve cooperating with cam profiles of the combined control slide.

In a preferred embodiment a combined integral supporting member for the record supports is secured in the sleeve, and comprises: an axially split record supporting ring which is bent from a flat resilient strip, substantially axially extending resilient members which are connected to the record supporting ring for resiliently loading the record supports, openings in the record supporting ring with locating edges which are bent towards the center of the record supporting ring which serve for hingeably accommodating segmental hinge portions of the record supports, and locking members which are bent towards the outside of the record supporting ring and which lock the record supporting ring in the sleeve by engaging corresponding openings in the wall of the sleeve.

A further reduction of the number of components required can be achieved with an embodiment of the invention which is characterized in that at one of their ends the record lifters are connected to and are integral with an axially split record lifting ring which is bent from a resilient sheet material, and the record lifting ring is clamped in a corresponding circular groove at the outside of a movable ring support. In this respect it is of advantage if the record hold-down devices consist of an axially split record hold-down ring which is bent from a resilient sheet material, the record hold-down ring is provided with locking portions which are bent towards the outside thereof, the record hold-down ring is clamped against the inside of the sleeve, and the locking portions are lodged in corresponding openings in the wall of the sleeve. Furthermore, it is also of advantage if the end cap at the end of the sleeve is provided with a number of integral axially extending projections with a hook-shaped end, the sleeve is provided with a number of corresponding locking openings with which the hook-shaped ends engage under the influence of the resilience of the projections, and the end cap is provided with inwardly directed portions which form a stop for the ring support of the record lifting ring which is axially movable inside the end cap.

In an embodiment in which the absence of further records on the changer pin is signalled to the changing mechanism of the record changer in order that the apparatus be switched off by blocking of the control slide, one or more record lifters near their free ends are provided with blocking cams which extend transversely to the longitudinal direction of the record lifters, for blocking the movements of the control slide after the last record has been played, the slots in the sleeve which correspond to the record lifters are locally provided with widened portions which correspond to the blocking cams, the locking cams are located before said widened portions in the position of the record lifters before a changing cycle commences, and in said position, in the absence of phonograph records on the changer pin, the record lifters are pivoted out of the sleeve to a position in which the blocking cams by engagement with the edges of said widened portions prevent axial movement of the record lifters.

BRIEF DESCRIPTION OF THE DRAWING

The invention will be described in more detail with reference to the drawing, in which FIG. 1 is a longitudinal section of a changer pin on which two phonograph records are stacked, the control slide and the elements of the changer pin cooperating therewith being in their initial position, before a changing cycle commences, FIG. 2 is a similar section of the changer pin of FIG. 1 after commencement of a chaning cycle, the control slide being already moved upwards over some distance so that the record lifters as well as the record holddown devices have made contact with the inner wall of the central opening of the lower record, FIG. 3 is another section in which the command slide has moved further, the upper record being lifted off the lower record and the record holddown device starting to release the lower record, FIG. 4 is yet another section showing the next phase of the changing cycle in which the record supports have pivoted inwards and the lower record can slide down along the sleeve of the changer pin onto the turntable, FIG. 5 is a section again showing the changer pin with the control slide in the initial position, but now without records being stacked on the pin, so that the records lifters are pivoted out of the housing with their free ends, in which position they prevent the control slide from being moved upwards in order to generate a signal for switching off the apparatus.

In the various Figures corresponding components are designated by corresponding reference numerals. In the case of three identical components these are designated by a reference numeral marked with a single accent, a double accent, or a triple accent.

Figure 6:
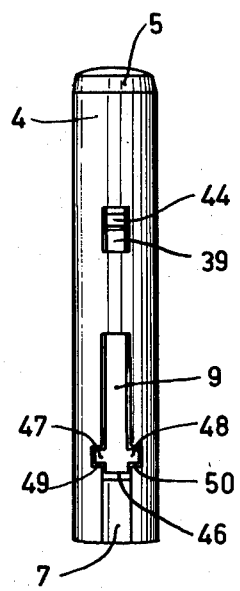
FIG. 6 is a partial elevation showing the record lifters locked.

On the changer pin 1 two phonograph records 2 and 3 are stacked, of the type with a central opening of approximately 7 mm. The changer pin comprises a cylindrical sleeve 4 for accommodating the mechanism. At the top the sleeve is closed with the aid of an end cap 5. In the long side of the sleeve a number of slots are formed. Through three slots 6 three pivotable spring-loaded record supports 7 can be pivoted out of the sleeve. Three further slots 8 serve for the passage of three record lifters 9 which are pivotable out of the sleeve and which are also axially movable to a limit extent. Three further slots 10 serve for the passage of the record hold-down devices 11 which hold down the lowermost record 2 during a phase in the changing cycle in which the upper record 3 is lifted off the lower record. In the center of the sleeve 4 there is disposed a first control slide 12 for the actuation of the record lifters 9 and the record hold-down devices 11, which slide is axially movable in the sleeve by a changing mechanism, not shown, of a record changer and which is provided with a number of cam profiles. The control slide 12 is axially loaded by a pressure spring 13 in a direction away from the end cap. Inside the sleeve a second movable control slide 14 is located which operates the record supports 7. The record lifters 9 are connected to an axially movable bushing 15 with one of their ends. This bushing is axially loaded by a pressure spring 16 in a direction away from the end gap 5. With the aid of a connecting member 17 the record hold-down devices 11 are rigidly connected to the sleeve 4 with one of their ends.

The two control slides 12 and 14 are combined with each other into a single combined control slide 18. The record supports 7 consist of two-armed levers which are hingeably connected to the sleeve 4 between their ends 19 and 20, the ends 20 which are disposed in the sleeve riding on the cam profiles 21 of the combined control slide 18.

Figure 7:
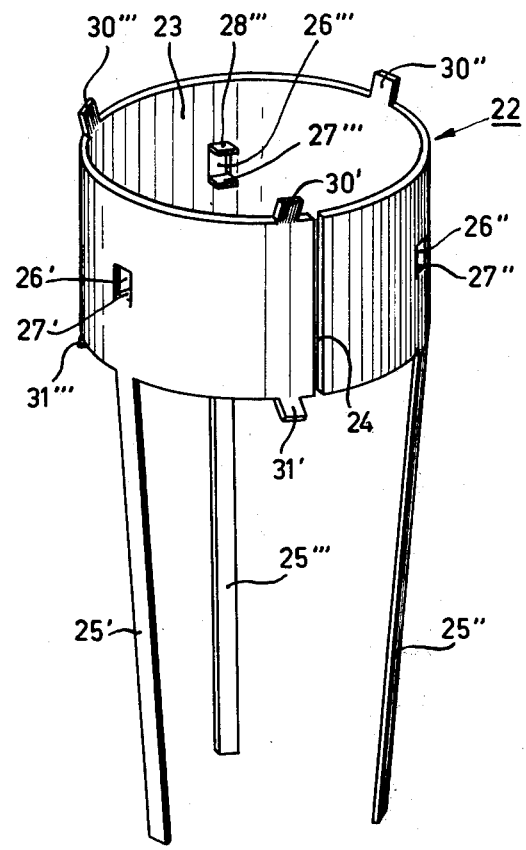
FIG. 7 is a perspective view to enlarged scale of the supporting ring used for the record supports.

A combined supporting ring 22 for the record supports 7, which member consists of one strip, is secured in the sleeve 4 (FIG. 7). It comprises a tubular supporting ring 23 with an axial split 24, which ring is bent from a flat resilient strip. Three substantially axially extending resilient member 25 for resiliently loading the record supports 7 are integrally formed with the ring 23. In the ring 23 three openings 26 are formed with support locating edges 27 and 28 which are bent towards the center of the ring, which opening serves for hingeably accommodating pivot projections 29 of the record supports 7. Furthermore, the ring 23 comprises a number of locking portions 30 and 31 which are bent towards the outside ring, which serve for locking the record supporting ring in the sleeve 4. For this purpose the locking portions cooperate with corresponding openings 32 in the wall of the sleeve.

Figure 8:
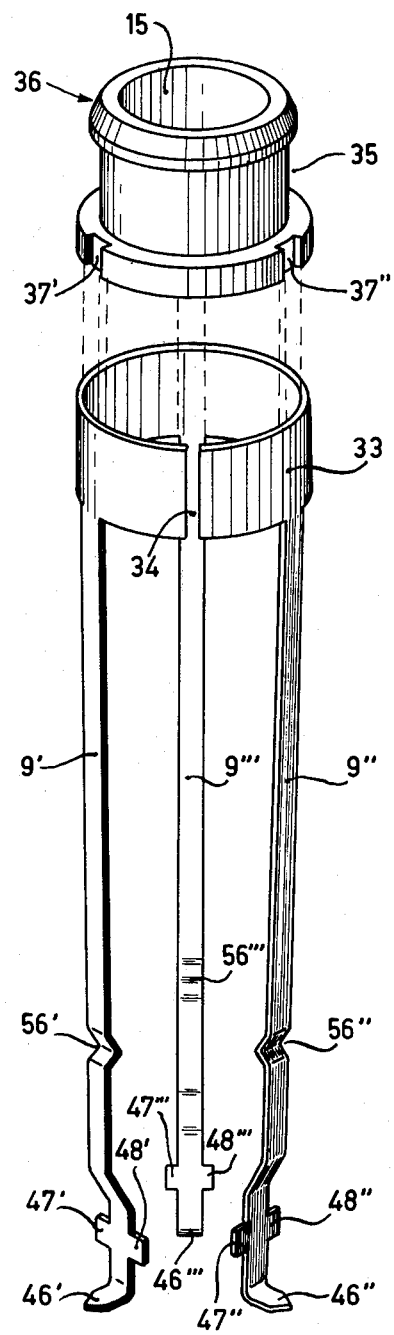
FIG. 8 is an exploded view in perspective of the recording lifting ring and the associated ring supports.

At one of their ends the record lifters 9, as can be seen in particular in FIG. 8, are connected to a record lifting ring 33 with an axial split 34, which is integral with them and which is bent from a resilient sheet material. The record lifting ring can be clamped in a corresponding circular groove 35 at the outside of the ring support 36, also shown in FIG., 8, which is axially movable in the sleeve 4. The ring support has three slots 37 corresponding to the record lifters 9, with which slots the record lifters engage in the assembled condition. Thus, the record lifting ring 33 is prevented from being rotated relative to the ring support 36.

Figure 9:
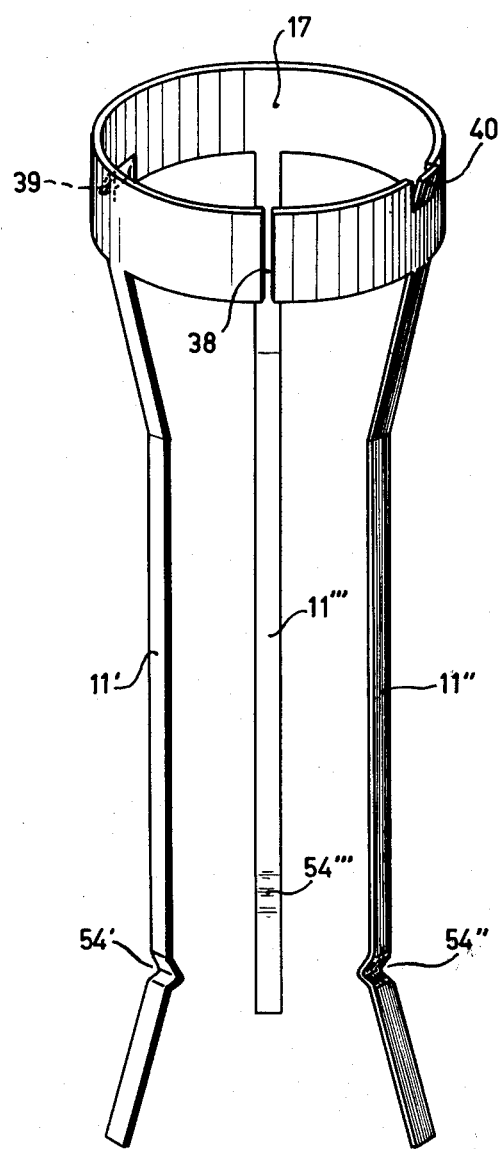
FIG. 9 is a perspective view of the record hold-down ring and members integral therewith.

The connecting member 17 for the record hold-down devices 11 (FIG. 9) consists of a record hold-down ring with an axial split 38 bent from a resilient sheet material, which is integral with axially extending resilient members which are the record hold-down devices 11. For locking the ring 17 in the sleeve 4 the ring is provided with a number of locking portions 39 and 40 which are bent towards the outside thereof. The record hold-down ring 17 is clamped inside the sleeve 4 which for locking purposes is provided with a number of openings 41 and 42 which correspond to the locking portions 39 and 40.

The end cap 5 at the end of the sleeve 4 comprises a number of integral axially extending projections 43 with a hook-shaped end 44 (FIGS. 1 to 5). Under the influence of the resilience of the projections 43 the end cap 5 is locked with the aid of hook-shaped ends 44 which engage with the corresponding openings in the sleeve. In FIGS. 1 to 5 only one such projection 43 is visible, the hook-shaped end 44 engaging with the opening 44 in the sleeve which also serves for locking the record hold-down ring 17. At its inside the end cap 5 is provided with inwardly directed portions 45 which constitute a stop for the ring support 36 of the record lifting ring 33, which support is axially movable inside the end cap.

As can be seen most clearly in FIG. 6 in conjunction with FIG. 8, the record lifters 9 comprise blocking cams 47 and 48, near their free ends 46, which cams extend transversely to the longitudinal direction, for blocking the axial movements of the control slide 18 after the last record has been played. The slots 8 in the sleeve 4 which correspond to the record lifters 9 have locally widened portions 49 and 50 which correspond to the blocking cams. In FIGS. 5 and 6 the combined control slide 18 is in the initial position. In this position the blocking cams 47 and 48 are located in front of the widened portions 49 and 50. In the absence of phonograph records on the changer pin, see FIG. 5, the record lifters 9 are pivoted out of the sleeve 4 to such a position that by engaging the edges of the widened portions 49 and 50 of the slot 8 the blocking cams prevent axial movement of the record lifters 9. As a result of this, the control slide 18 can only move in an axial direction until the instant that the top 51 of the control slide presses against the underside of the record lifting ring 36, which in this situation constitutes a fixed stop for the control slide 18.

The operation of the changer pin in accordance with the invention will now be described in more detail with reference to FIGS. 1 to 6. Starting from the initial position shown in FIG. 1 a changing cycle commences when the changing mechanism of the record changer presses against the underside 52 of the combined control slide 18. The slide 18 is pressed upwards axially inside the sleeve, the sleeve 4 itself remaining stationary relative to the changing mechanism of the record changer. This stationary position is obtained by inserting the sleeve into a corresponding bushing in the center of the turntable of the record changer and locking it there with the aid of the pin 53, which in addition also serves to limit the stroke of the combined control slide 18. FIG. 2 shows the situation in which the control slide 18 has moved so far upwards that its top 51 just contacts the ring support 36. On the cam 55 of the slide 18 a projection 54 of the record hold-down devices 11 is located. As a result of this, the record hold-down devices are bent outwards and the lowermost record 2 is retained by the free end of the record hold-down device 11. A projection 56 of the record lifter 9 is disposed on a cam 57 of the control slide 18, so that the pointed end 46 of the record lifter is pressed against the inside of the central opening of the record 2. As the control slide 18 moves further upwards the record lifting ring 33 and thus the record lifter 9 will be moved up by the end 51 of the control slide. As a result, the ends 46 are urged upwards along the wall of the central opening of the record 2 until the ends 46 can penetrate between the records 2 and 3 to be separated. In FIG. 3 the control slide 18 has been moved upwards slightly further so that the record 3 is lifted off the record 2 by the record lifters 9. The projection 54 of each record hold-down device 11 now disengages from its associated cam 55, while the record 3 is further lifted by the record lifters 9. At the instant that the lower ends 20 of the pivotable record supporting levers 7 contact their associated cam profile 21 of the control slide 18, the record supports 7 are tilted relative to the projection 29 which serves as a hinge, so that upper ends 19 are moved towards the inside of the sleeve. This also gives rise to a small axial movement of the record 2 in an upward direction, which movement is not impeded because the record hold-down devices 11 no longer make contact with the edge of the central opening of the record 2. In FIG. 4 the situation is reached in which the record supports 7 are completely pivoted into the sleeve and the lowermost record 2 can drop onto the turntable along the outer wall of the sleeve 4. Subsequently the control slide is returned under the influence of the pressure springs 13 and 16 to its initial position shown in FIG. 1.

As previously stated the maximum travel of the control slide is limited by the locking pin 53, which has play in a slotted opening 58 in the control slide.

In the absence of phonograph records on the changer pin, see FIGS. 5 and 6, the changing cycle described hereinbefore cannot be performed. As the control slide 18 moves upwards the end 46 of the record lifter 9 does not hit the inner wall of a central opening of a record, so that the record lifters 9 can pivot out further. The ends 46 pivot out of the sleeve, so that the blocking cams 47 and 48 assume such a position that when the record lifting ring 33 is moved up by the upper end 51 of the control slide 18 they hit the upper wall of the widened portions 49 and 50 of the slot 8. As previously stated, this prevents a further axial movement of the control slide 18. This blocking of the control slide 18 forms a signal for the record changer that there are no longer any records on the changer pin. The record changer may be provided, in a manner commonly used in conventional record changers, with a changing mechanism which responds to such a signal by switching off the apparatus.

What is claimed is:

1. A changer spindle for a record changer having a changing mechanism suitable for changing and completely independently supporting a plurality of phonograph records comprising
    a cylindrical sleeve having an upper end, at least three first slots and a plurality of second slots,
    an end cap,
    means connecting the end cap to the sleeve at said upper end,
    at least three record supports comprising two-armed levers having first and second ends, pivotally mounted in the sleeve between said ends,
    spring means for biasing said supports pivotally to a supporting position in which said first ends project outward through said first slots, said biasing means comprising an axially split tubular supporting ring having integrally formed therewith axially extending resilient members, inwardly extending support locating edges, and an outwardly extending locking portion; said sleeve having openings in which said locking portion engages to position said supporting ring; said ring having at least three openings formed by bending inwardly material from which said edges are formed, said openings being spaced circumferentially and at the same axial location along said ring, two edges at opposite axial ends of each opening being arranged for axially positioning a record support therebetween, said record support having a pivot projection received between said edges; said resilient members extending axially in line with respective openings arranged for engaging with and biasing respective second ends of said record supports.
    a single control slide movable axially within said sleeve between sequential initial, hold-down, lifting and drop positions, and having at least a first cam profile for engagement by said second ends of said levers so as to withdraw said first ends into the first slots in response to movement of said slide to the drop position, and a second cam profile,
    means responsive to movement of said slide to the lifting position for lifting upper records of a stack off a lowermost record,
    a plurality of record hold-down devices, means for positioning said hold-down devices with respect to the sleeve and for engaging said second cam profile so as to move said hold-down devices out through respective ones of said second slots when said slide is in said hold-down position, for holding down the lowermost record of a stack of records on the changer spindle during a phase in the changing cycle in which upper records are lifted off the lowermost record by said lifting means, and a pressure spring for axially loading the control slide in a direction away from the end cap.

2. A changer spindle as claimed in claim 1 wherein said plurality of hold down devices and said means for positioning comprise an integral axially split tubular record hold-down ring having a plurality of axially extending resilient members and an outwardly extending device locking portion, said sleeve comprising respective openings for engagement by said device locking portion for axial and angular positioning of said hold-down ring, said device axially extending resilient members being aligned with said plurality of second slots, distal ends of said device resilient members extending into respective slots.

3. A changer spindle for a record changer having a changer mechanism suitable for changing and completely independently supporting a plurality of phonograph records comprising:

a cylindrical sleeve having at least three axially extending lifter slots therethrough, circumferentially spaced at a same axial location, and an upper end; an end cap;

means connecting said end cap to said sleeve at said upper end;

a single control slide mounted within said sleeve;

means responsive to axial position of said slide for supporting a stack of phonograph records on said sleeve from below a lowermost record of the stack, and for withdrawing said support;

means for holding down the lowermost record against upward lifting force, a record lifting member comprising an integral axially split tubular record lifting ring having at least three axially extending lifting fingers, said fingers having distal ends bent outwardly and arranged to project at least into said sleeve slots, said fingers each having an intermediate inwardly projecting portion, at least one finger comprising an integral blocking cam adjacent its distal end, said cam having surfaces extending transversely to the axial direction of said finger, a respective slot in said sleeve has a locally widened portion at the location of said cam, said finger being in a lowered position;

a movable ring support clamped within said split ring;

said single control slide having means for operatively controlling said record hold-down means in response to axial position of said slide, an upper end of said slide engageable upon initial axial motion with said ring support means for positioning said blocking cam in said locally widened portion in the absence of a record on said support means whereby upon axial movement of said slide during a changing cycle, engagement of the upper end of said slide with said ring support prevents further movement of said slide; and comprising a spring urging said ring support away from said upper end of said slide; and means for biasing said ring support away from said end cap.

4. A changer spindle for a record changer having a changer mechanism suitable for changing and completely independently supporting a plurality of phonograph records comprising:

a cylindrical sleeve having at least three axially extending lifter slots therethrough, circumferentially spaced at a same axial location, and an upper end;

an end cap, means for connecting said end cap to said sleeve at said upper end;

a single control slide mounted within said sleeve;

means responsive to axial position of said slide for supporting a stack of phonograph records on said sleeve from below a lowermost record of the stack, and for withdrawing said support;

means for holding down the lowermost record against upward lifting force, a record lifting member comprising an integral axially split tubular record lifting ring having at least three axially extending lifting fingers, said fingers having distal ends bent outwardly and arranged to project at least into said sleeve slots, said fingers each having an intermediate inwardly projecting portion;

a movable ring support clamped within said split ring;

said single control slide having means for operatively controlling said record hold-down means in response to axial position of said slide, an upper end of said slide engageable upon initial axial motion with said ring support;

a spring urging said ring support away from said upper end of said slide; and means for biasing said ring support away from said end cap, wherein said sleeve comprises a locking opening for the cap, and the end cap comprises a number of integral resilient axially extending projections with a hook shaped end for engaging in a respective locking opening, and inwardly directed stop portions for engaging said ring support limiting axial movement of the support away from the cap end of the sleeve.

* * * * *